July 15, 1952 F. K. LOW 2,603,716

DECODER AND TRANSLATOR WITH READILY CHANGEABLE TRANSLATIONS

Filed Dec. 23, 1949 6 Sheets-Sheet 1

INVENTOR
F.K. LOW
BY William F. Simpson
ATTORNEY

July 15, 1952 F. K. LOW 2,603,716

DECODER AND TRANSLATOR WITH READILY CHANGEABLE TRANSLATIONS

Filed Dec. 23, 1949 6 Sheets-Sheet 2

INVENTOR
F. K. LOW
BY
William F. Simpson
ATTORNEY

DECODER AND TRANSLATOR WITH READILY CHANGEABLE TRANSLATIONS

Filed Dec. 23, 1949 6 Sheets-Sheet 3

INVENTOR
F. K. LOW
BY William F. Simpson
ATTORNEY

July 15, 1952 F. K. LOW 2,603,716

DECODER AND TRANSLATOR WITH READILY CHANGEABLE TRANSLATIONS

Filed Dec. 23, 1949 6 Sheets-Sheet 4

INVENTOR
F. K. LOW
BY William F. Simpson.
ATTORNEY

July 15, 1952 F. K. LOW 2,603,716

DECODER AND TRANSLATOR WITH READILY CHANGEABLE TRANSLATIONS

Filed Dec. 23, 1949 6 Sheets-Sheet 5

INVENTOR
F. K. LOW
BY William F. Simpson
ATTORNEY

July 15, 1952 F. K. LOW 2,603,716

DECODER AND TRANSLATOR WITH READILY CHANGEABLE TRANSLATIONS

Filed Dec. 23, 1949 6 Sheets-Sheet 6

INVENTOR
F.K. LOW
BY William F. Simpson.
ATTORNEY

Patented July 15, 1952 2,603,716

UNITED STATES PATENT OFFICE 2,603,716

DECODER AND TRANSLATOR WITH READILY CHANGEABLE TRANSLATIONS

Frank K. Low, Orange, N. J., assignor to Bell Telephone Laboratories, Incorporated, New York, N. Y., a corporation of New York Application December 23, 1949, Serial No. 134,699

6 Claims. (Cl. 179—18)

Figures 1, 7:
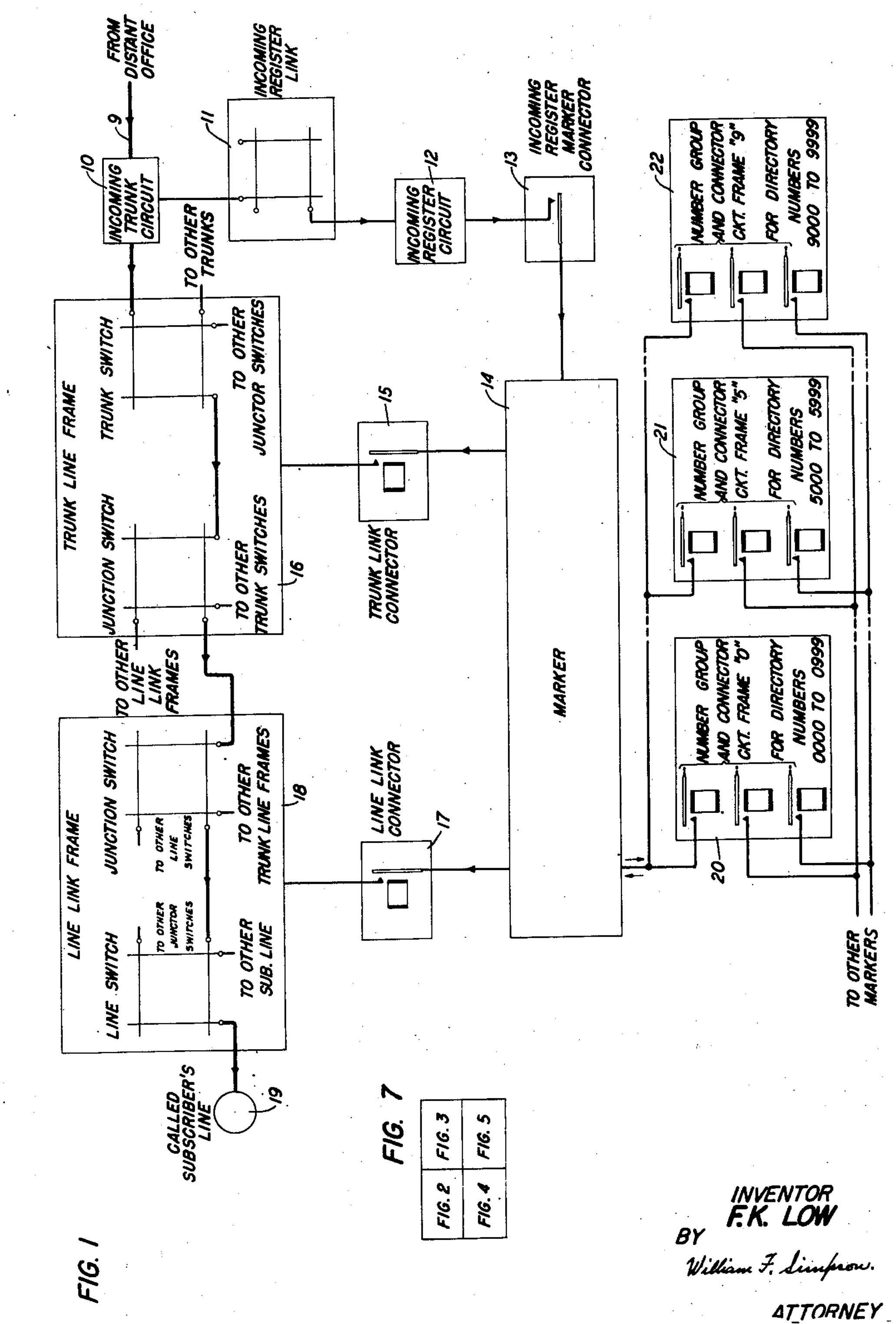

This invention relates to automatic telephone systems of the common control type and more particularly to those types in which the physical location of a subscriber's line on switches or switch frames does not correspond to its directory number.

In such systems, as for example of the crossbar type such as described in patent application of A. J. Busch, Serial No. 57,394, filed October 29, 1948, which issued as Patent 2,585,904 on February 19, 1952, the directory number is a decimal system number or a combination of letters and decimal system number in which the letters also are represented by digits of the decimal system. The directory number is the number dialed by the calling subscriber by operation of his dial or keys of the usual type which transmits pulses or other types of signals in the central office to identify the called subscriber's station and line.

The physical or equipment location of the line to which the incoming call may be directed must be identified by a combination of other symbols or numbers specifying which frame, horizontal group, the vertical group of lines and a particular terminal within such subgroup in order for the equipment to establish a connection to said line. In addition, the type of ringing current or signal required for the line and other special information about its type and type of service to which it is entitled must also be designated by various other representations or numbers. In order to provide the necessary amount of flexibility to properly distribute the traffic throughout switches in the office, the line location information as well as the ringing and other information can not be identical with the directory number yet must be derived from it.

It is further required that the relationship between the directory numbers and the equipment location and additional information relative to the various lines will be readily changeable because traffic loads on the switch frames vary, because directory numbers and other changes are made, and because it is undesirable to continually change directory numbers at short intervals to compensate for these various changes.

It is common practice in systems of the type described in the above-identified patent application of Busch to decode or translate a directory number dialed by a calling subscriber into a new series of numbers or designations corresponding to the equipment location of the line, the type of ringing signal and such other information as may be desired or required by the switching apparatus. With the aid of such decoder or translator, a marker, or other comparable common control circuit or circuits, is enabled to establish the desired connection through the switching equipment to the called line in response to the dialed directory number.

It is an object of the present invention to perform the decoding and translating functions in common control telephone switching systems by means of electron tubes so as to reduce the time required for the establishment of conversations and thus increase the call carrying capacity of a telephone switching office.

It is a further object of the invention to provide a cross-connecting field by means of which changes in the relationship between the directory number and location of the line on the frames and equipment can be quickly and expeditiously made.

A feature of the invention relates to a coordinate array of cross-connecting points, each point comprising a jack or socket into which a low pressure gas conduction tube may be inserted for establishing the desired cross-connections.

Figure 4:
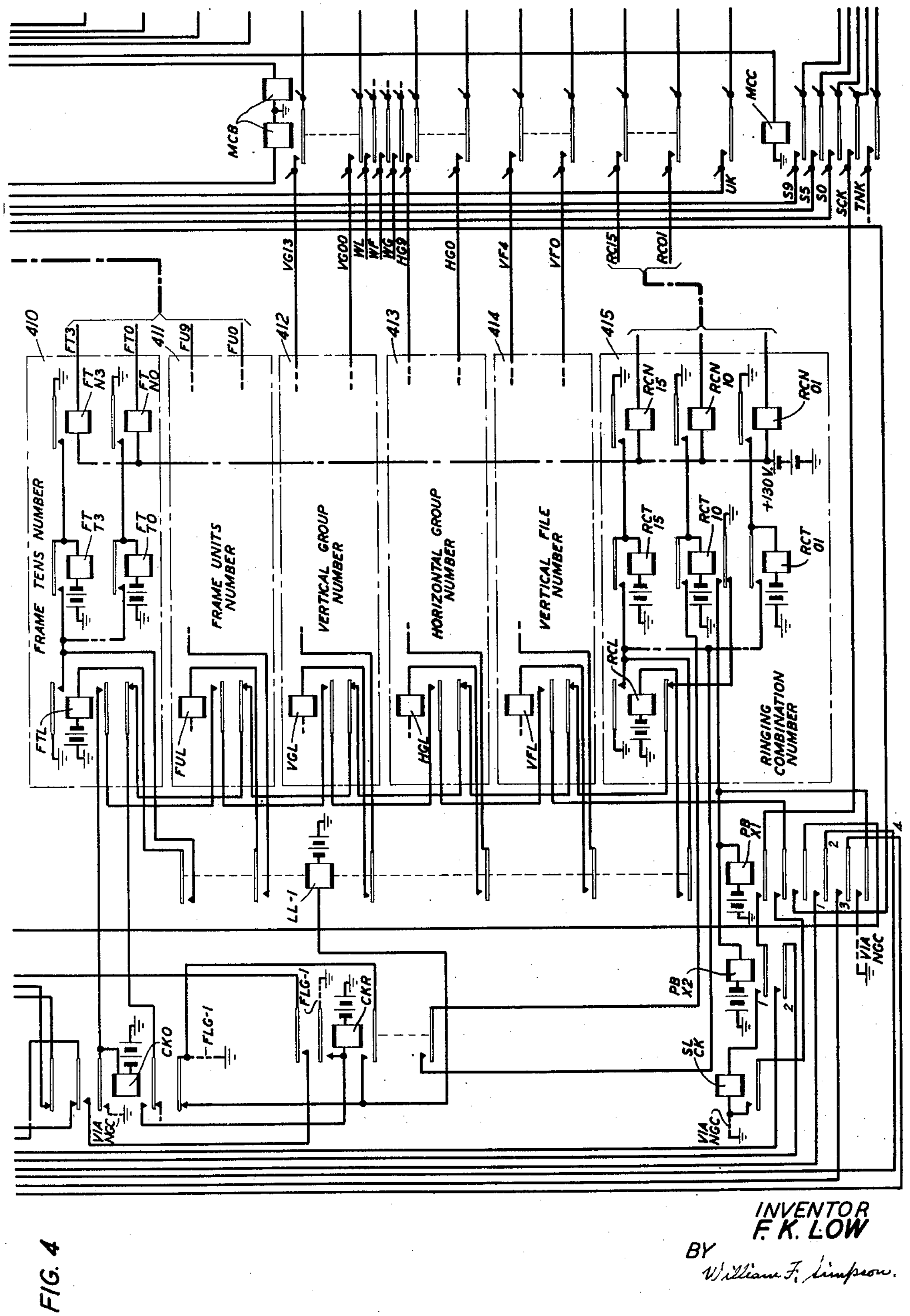
Figure 5:
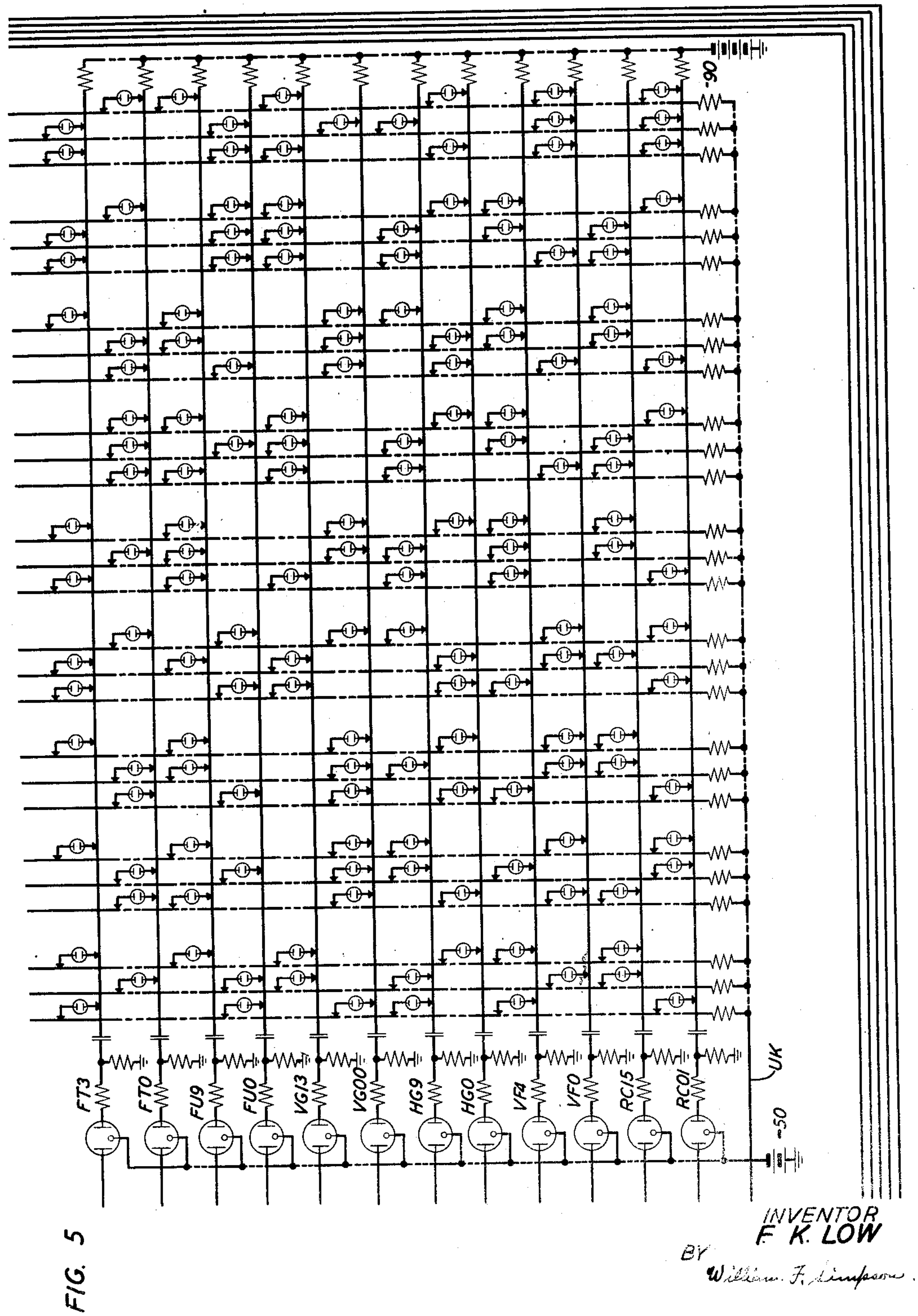
Figure 6:
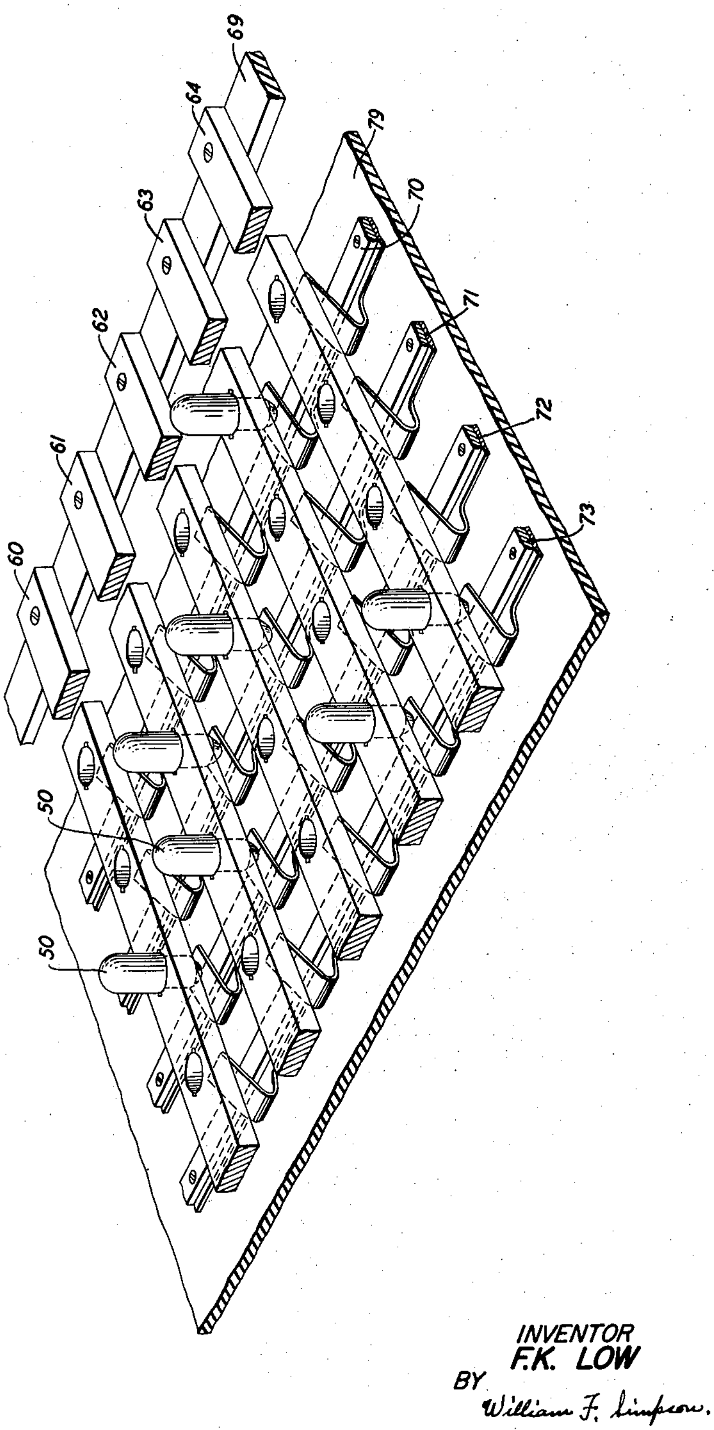

The foregoing and other features of this invention may be more readily understood from the following description when read with reference to the attached drawing in which:

Fig. 1 shows in outline form various switches and control circuits employed in establishing the connection from an incoming line or trunk to a called subscriber's station under control of a directory number;

Figs. 2, 3, 4 and 5 show in greater detail an exemplary arrangement of certain elements of a marker circuit which cooperate with the decoding and translating equipment as well as details of the decoding and translating equipment employed as the so-called number group circuit in accordance with this invention for translating the directory number of the called subscriber's line into numbers or other indicia indicating the location of the line in the switching system and the type of ringing current required, and any other additional information which may be desired or required. This additional information may assume many different forms including types of terminations of the line, types of supervision, type of party line subscriber's station, type of service to which the line is entitled, transmission requirements, etc.;

Fig. 6 shows a perspective view of the cross-connecting array of the tube sockets with tubes inserted in certain of them to form a cross-connecting pattern which cross-connections may be readily changed by merely changing the location of the tubes in the various tube sockets; and Fig. 7 shows the manner in which Figs. 2, 3, 4 and 5 are positioned adjacent to one another.

Fig. 1 shows in outline form various component circuits and switching apparatus for establishing a typical call through a cross-bar switching system of the type described in the above identified Busch application. Line 9 represents an incoming trunk from a distant switching center and is terminated in an incoming trunk circuit 10. When the trunk circuit is seized at the distant office, a supervisory signal is transmitted over the trunk circuit line to relay circuit 10 which causes this terminating circuit 10 to function and initiate operation to the control circuits which in turn cause an incoming register link 11 to establish a connection from the incoming trunk terminating circuit 10 to an idle incoming register circuit such as 12. There may be numerous incoming trunks 9 from the same office as the one over which the exemplary call is assumed to originate and there may be other incoming trunk circuits from any other office. These incoming trunk circuits may employ the same or different incoming register links to establish connections from the incoming trunk circuits to idle register circuits. Upon the establishment of a connection to an idle incoming register circuit, a supervisory signal is transmitted through the incoming register link 11 and the trunk circuit termination 10 and over trunk 9 to the distant central office.

Upon reception of this signal this central office will transmit the called subscriber's directory number by means of suitable pulses or other types of signaling current or currents. These pulses are transmitted from the distant office over trunk 9 to the incoming register circuit 12 where they are recorded or stored by the register circuit and its associated equipment.

When the number has been substantially completely received and additional information relative to the particular incoming trunk circuit and its location on the switching frame has also been recorded in the register circuit, the register circuit will advance and actuate an incoming register-marker connector 13 to establish a connection between the register and an idle marker circuit.

When this connection is established the directory number of the called subscriber is transmitted to the marker circuit which marker circuit uses the thousands designation to select one of the various number group circuits 20, 21 and 22. Upon the selection of such a circuit when the circuit becomes idle, the marker 14 transmits the directory number of the called subscriber to the number group circuit. The number group circuit then translates this number into other numbers or indicia indicating the location of the called line as well as the class of service and ringing current required and transmits such indications to the marker circuit. Thereafter the marker may disconnect the number group circuit so this circuit will be available for use in establishing other connections.

The marker then employs this information together with the information relating to the location of the incoming trunk circuit to establish a path from the incoming trunk to the called subscriber's line such as subscriber 19. In establishing this path the marker first actuates the trunk line connector 15 and the line link connectors 17, which connectors establish connections between the trunk link frame and the line link frame and the marker circuit. The marker then tests the possible paths through these frames from the incoming trunk circuit 9 to the called subscriber 19 and upon finding an idle path establishes connection between these lines. The marker will then cause the proper ringing circuits to function to apply the proper ringing potentials to the subscriber's line after which the marker circuits and related control circuits are free to aid in the establishment of another call.

When the called party answers, the talking battery supply and supervisory circuit is established and at the termination of the call, the switches are restored to their normal or idle positions, thus interrupting the connection between the incoming trunk 9 and the called subscriber's line 19.

The present invention relates to electronic means and methods for receiving, decoding and translating the called subscriber's number into proper indicia for designating the location of the called line upon the switch frames or switches.

The number group circuits are illustrated in Fig. 1 by rectangles 20, 21 and 22. Only three of the number group circuits are represented in Fig. 1. It will be understood, however, that any suitable number of such circuits may be provided as may be required be the number of lines terminating in the central office.

Likewise, only one marker circuit and one line link frame and one trunk link frame and one representation of other control circuits are shown in Fig. 1. It is to be understood, of course, that the various circuits, frames and other telephone equipment will be duplicated as often as necessary to handle the desired or necessary volume of traffic and desired number of subscribers' stations.

In other words, the number of number group circuits in an office depends upon the number of subscribers, there being one number group circuit for each thousand subscribers. In addition, usually more than one marker circuit is provided, but the circuits are so arranged that only one marker may be connected to a particular number group circuit at any one time.

Figure 2:
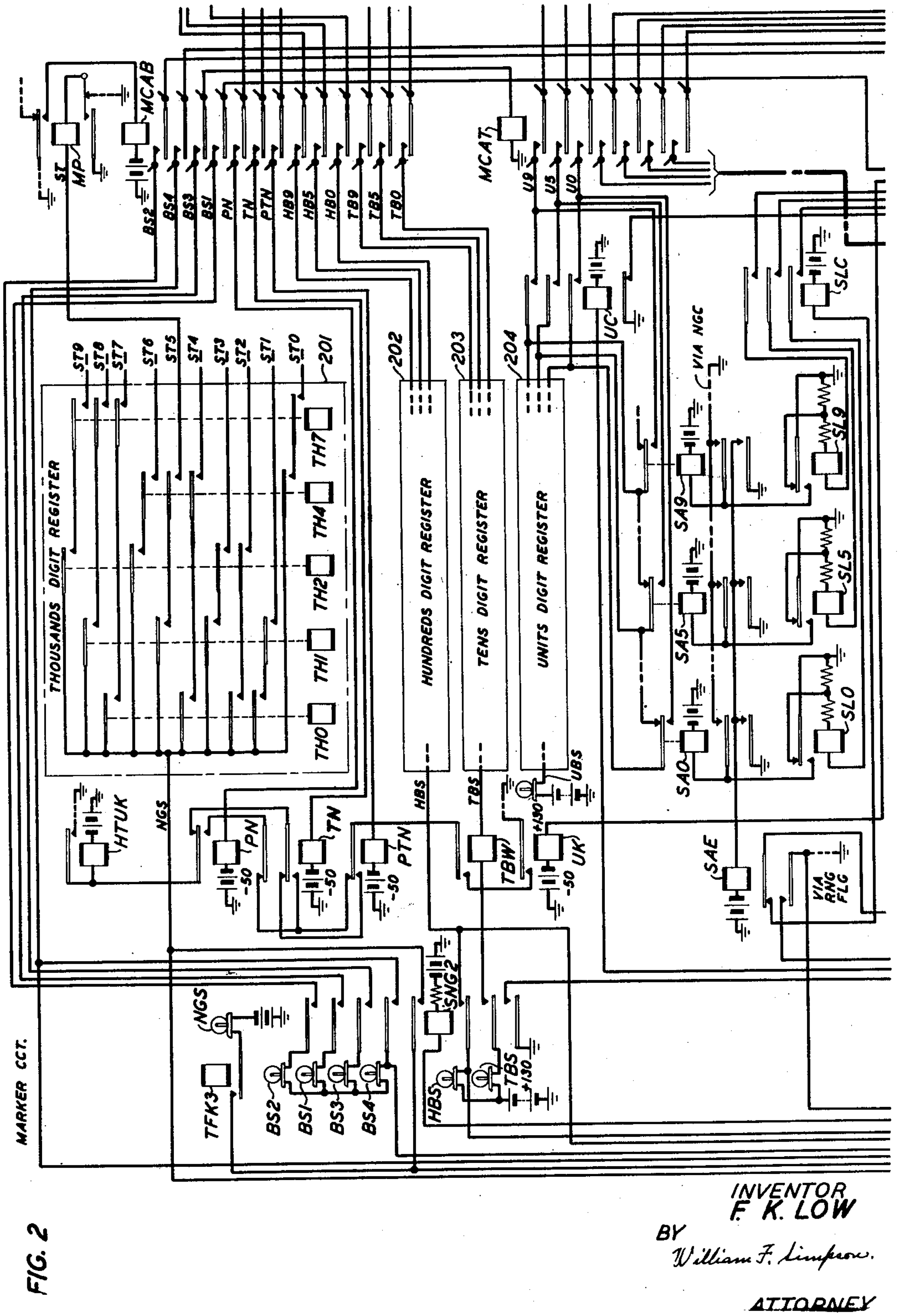
Figure 3:
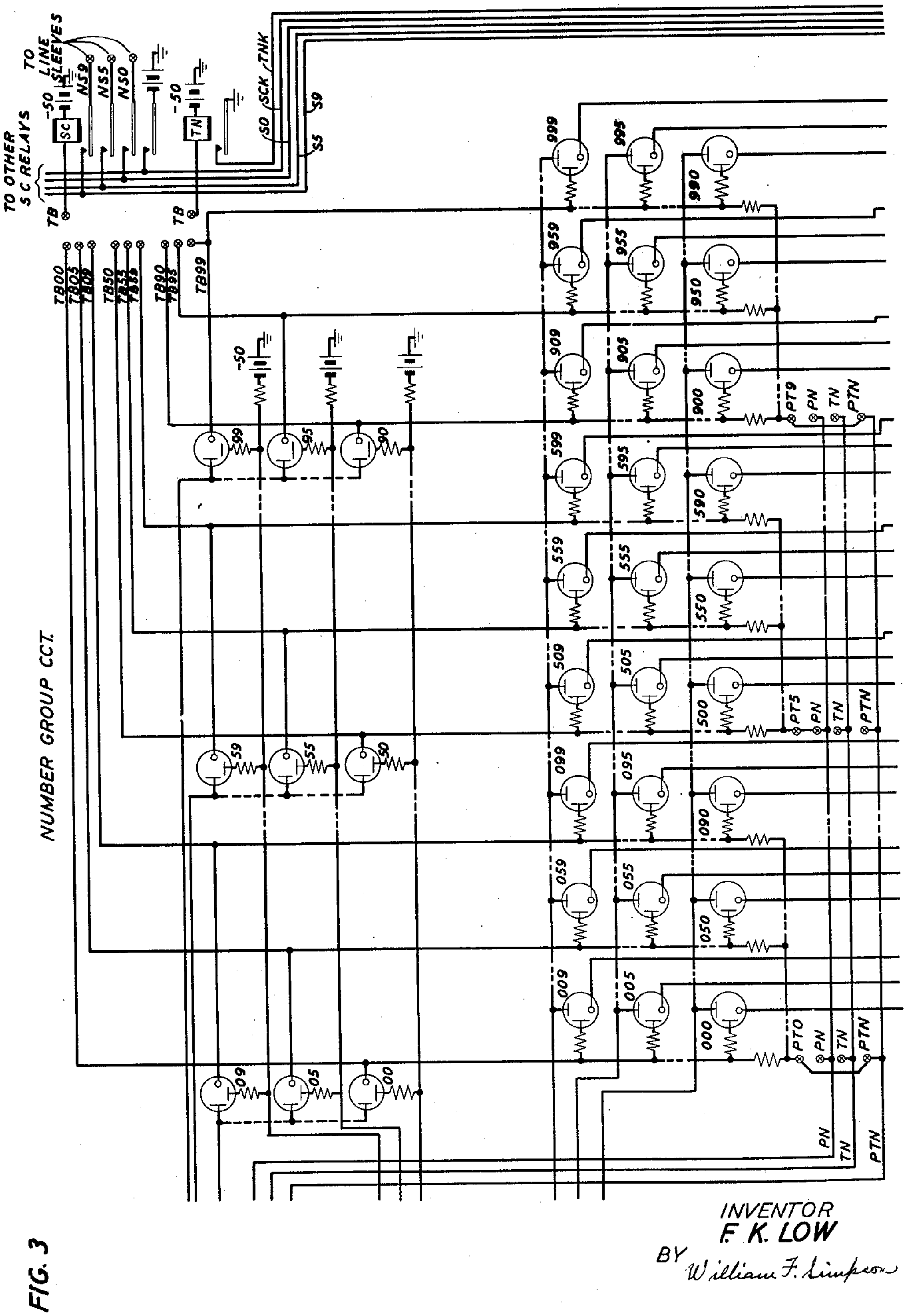

In Figs. 2, 3, 4 and 5, when Fig. 3 is arranged to the right of Fig. 2 and Fig. 4 below Fig. 2 and Fig. 5 below Fig. 3, the circuit details of the number group circuit together with certain portions of the marker circuit which cooperate therewith are shown in detail. Fig. 2 shows the portion of the marker circuit in which the directory number is recorded or stored.

Fig. 3 shows the decoding arrangement employing a plurality of three-element gas tubes. Fig. 5 shows the cross-connecting field wherein cross-connections may be made from the decoded directory numbers of called stations to a plurality of leads representing items of information subsequently used by the marker in extending the connection from the incoming trunk to the line link frame. Fig. 4 shows a manner in which the information from the number group circuit is recorded in the marker circuit.

In the upper part of Fig. 2 are partly shown and partly indicated four sets of relays 201, 202, 203 and 204 used by the marker for registering the four-digit "directory" number of the called party after these digits have been transmitted to the marker from the incoming register circuit. There are five relays in each of the four sets. The numerical value of each digit is indicated by the operation of a particular two of the five relays in the set, the other three relays remaining unoperated. For example, in the thousands digit register the digit "1" is registered by the operation of relays (TH0) and (TH1), the digit "2" by the operation of (TH0) and (TH2), etc. The digit "0" is registered by the operation of (TH4) and (TH7). Five relays used in a similar manner are provided for registering each of the other three digits, namely, hundreds, tens and units.

When the marker receives a four-digit number corresponding to the terminal of the called party, it uses the thousands digit to determine to which number group it will connect. The setting of the relays (TH0), (TH1), (TH2), (TH4) and (TH7) in the thousands digit register prepares a path for seizing the particular number group circuit provided for decoding the one thousand three-digit numbers identified by the thousands digit register. For example, if the thousands digit is "5," the number group chosen will be that one provided for decoding numbers between 5,000 and 5,999. The three-digit number registered on the hundreds, tens and units register relays constitutes the input information sent into the number group circuit.

Fig. 4 shows or indicates six sets of relays 410, 411, 412, 413, 414, 415 used for receiving and registering output information from the number group circuit. One receiving relay of each of the six sets such as the (FTN3) relay, for example, is operated by the number group circuit following the latter's decoding and translating function. The receiving relay in turn operates and locks an auxiliary test relay such as (FTT3), for example, which continues to store the item of information it represents after the number group has been discharged. The tens digit of the frame number on which the called line terminal is located is indicated by the operation of one of the four relays designated (FTT0) to (FTT3) in the upper group, designated 410, of the six group series. The units digit of the frame number is indicated by the operation of one of ten similar relays in the group designated "frame units number." Similarly, the number of the vertical group, that of the horizontal group, and that of the vertical file (the final subdivision of a vertical group) are all indicated by the operation of one relay in each of the sets designated "vertical group number," "horizontal group number" and "vertical file number," respectively. The type of ringing signal required for signaling the subscriber's station is indicated by the operation of one of the fifteen relays designated (RCT01) to (RCT15) in the group designated "ringing combination number."

In addition to the digit register and output information relays, the control relays of the marker directly concerned with the seizure and operation of the associated number group circuit are shown.

When the marker reaches that point in its operating cycle at which it is necessary to call for the services of a number group circuit, certain preparatory steps are taken among which are the application of off-normal grounds to several of the relays shown in Figs. 2 and 4. These off-normal ground supplies are established by the operation of relays (FLG), (FLG1) and (NGC) whose contacts are indicated by dotted lines but which are not fully shown. The off-normal ground supplied by the (FLG) relay by way of a break contact on CKO operates (SNG2) relay. (SNG2) in turn operates (UC) relay and supplies battery potential to several leads and partially closes a path over which seizure of the number group circuit is effected.

The actual seizure of the number group starts shortly after the operation of (SNG2), when the (TKF3) relay of the marker operates. The operation of this relay completes a circuit from battery through the NGS lamp, through (SNG2) and through two previously operated (TH–) relays in the thousands digit register over the "ST" lead to the (MP) relay in the number group circuit whose block of one thousand numbers corresponds to the thousands digit and to the number of the energized "ST–" lead. By way of example, it is shown that lead "ST5" in Fig. 2 is connected to the (MP) relay in Fig. 3. This is based on the assumption that the thousands digit registered was the digit "5" and that the (TH1) and (TH4) relays had been operated.

The (MP) relay is one of a chain of "marker preference" relays within the number group circuit all of which correspond to the same thousands digit of the directory number. The particular (MP) relay operated in the chain corresponds to the marker seeking connection to the number group circuit in question. Should another marker circuit operate the same thousands digit register relays in its own circuit, it would make a connection to another marker preference relay in the chain. The purpose of the chain of marker preference relays is to establish a connection from the first marker circuit which operated one of these relays to the connector relays in the number group circuit, and to lock out other (MP) relays and connections from other marker circuits seeking the same number group frame.

When an (MP) relay operates, it operates connector relay (MCA—B). The (MCA—B) establishes connections between the hundreds and tens digit registers over leads "HB0–9" and "TB0–9," respectively, to electronic decoding circuit of the number group frame shown in Fig. 3. The (MCA—B) relay also completes connections from battery potentials via lamps BS1, 2, 3 and 4, the contacts of previously operated relay (SNG2), over leads "BS1," 2, 3 and 4 to the windings of additional connector relays designated (MCA—T), (MCB) (a two-section, two-coil relay) and (MCC). The (MCA—T) connector relay, in operating, establishes connections between the units digit register via the previously operated (UC) relay and leads "U0–9" to the decoding circuit of the number group. It also establishes connections between the frame tens number and frame units number information receiving relays over leads "FT0–3" and "FU0–9" to the output of the translating circuit of the number group shown in Fig. 4. Connector relay (MCB) establishes connections between the vertical group number, horizontal group number and vertical file number and ringing combination number information receiving relays to the output of the translating circuit. (MCB) also closes the "UK" lead whose function is described later and leads "WL," "WF" and "WG." These latter leads perform essential functions in the joint operation of the number group and marker circuits of the type disclosed in the copending Busch application. They are not required, however, for the number group circuit described herein. Connector relay (MCC) closes leads "S0–9," "SCK" and "TNK" whose purpose is described later.

All leads shown connected to the marker side of connector relays (MCAB), (MCA—T), (MCB) and (MCC) are multipled to corresponding contacts on similar connector relays in all other number group circuits thereby permitting the marker under consideration to be connected to any number group circuit depending, of course, on which combination of thousands digit register relays are operated. All leads shown connected to the number group side of the connector relays are multipled to corresponding contacts on other similar connector relays within the number group circuit under consideration but associated with other marker circuits, thereby permitting the number group circuit under consideration to be connected to any marker depending on which relay in the chain of marker preference relays is operated.

The decoding circuit shown in Fig. 3 employs 1100 three-element gas tubes for reducing a three-digit number to a basis of one marked lead out of a thousand. In order to make the description of operation of this circuit more clear, suitable working voltages will be assumed. With the number group connector relays having been operated, −50 volts is applied through relay windings and resistances to the cathodes of all 1100 triodes. The cathodes of the upper group of 100 tubes designated 00 to 99 are connected through resistors to cross-connecting punchings PT0 to PT9. The one hundred resistors involved comprise ten groups of ten resistors each. The ten resistors associated with the cathodes of tubes 00 to 09, all of whose anodes are connected to the "HB0" lead, are connected together at the PT0 punching. Similarly, each other group of ten resistors is connected to a PT– punching whose number corresponds to the number of the "HB–" lead also associated with the same group of ten tubes. It is required that each PT– punching be cross-connected to one but only one of the three nearby punchings designated PN, TN and PTN. These punchings through contacts of the previously operated (MCA—B) relay are connected through the low resistance windings of relays (PN), (TN) and (PTN) to −50 volts. The purpose of the PN, TN and PTN punchings and associated marker relays is given later. The cathodes of the one thousand tubes designated 000 to 999 are connected through an individual resistor to a common lead designated "UK." This lead passes through the (MCB) connector relay and through the low resistance winding of the (UK) relay in the marker to −50 volts.

By reason of the prior operation of (SNG2), (UC), (MCA—B) and (MCA—T) relays the hundreds, tens and units digits are now presented to the number group in the form of +130 volts on one lead out of each of the ten leads in the HB–, TB–, and U– groups. Since −50 volts appears on all decoder tube cathodes the application of +130 volts to one of the "TB" leads fires the control gaps of all ten tubes in the corresponding horizontal row. Positive 130 volts on one of the "HB–" leads puts potential on the anodes of all ten tubes in the corresponding vertical row. A main gap discharge takes place only in the tube located at the intersection of the tens and hundreds leads because only this one tube will have both its control gap fired and anode potential present. The foregoing action constitutes a tens selection and causes the potential of one of the hundred tens bus-bars to change from −50 volts to approximately +50 volts. When the main gap discharge takes place, the potential between the anode and cathode drops to a value in the neighborhood of 80 volts. Since there is +130 volts on the anode, there normally being negligible voltage drop in the HBS protective lamp, there is then +50 volts on the cathode. This rise in potential causes the control gaps to fire on all ten units tubes in the corresponding vertical row. With +130 volts having been applied by way of one of the "U–" leads to the anodes of the one hundred tubes in the corresponding horizontal row of units tubes, the tube at the intersection will fire across its main gap and thus cause the potential on one of the thousand units vertical bus-bars to change from −50 volts to approximately +50 volts. This latter action constitutes the units selection and completes the decoding operation, since each one of the units bus-bars corresponds to one of the one thousand directory numbers served by the number group frame.

To facilitate the location of trouble conditions, should they arise, the marker provides certain relays which effectively check the progress of the call. The (TBW) relay is comparatively low in resistance and operates when the circuit is completed from +130 volts via the TBS protective lamp to −50 volts via one of the resistors terminating the ten "TB" leads in the number group. The operation of this relay is taken as an indication that the continuity of the chosen path is intact and that firing voltage is applied as intended to the control anodes of the tubes associated with the chosen "TB–" lead. When one of the one hundred "tens" tubes fires the resulting cathode current flows through the winding of either the "PN," "TN" or "PTN" relay in the marker depending on which similarly designated terminal is cross-connected to the PT– terminal involved. The operation of one of these three relays shows not only that the "HB" lead circuit is intact but that the chosen tube actually fires. When a "units" tube fires the resulting cathode current passes through the winding of the (UK) relay in the marker which operates providing a check of the number group circuit operation up to this point. The sum of these three checks results in the operation of the "hundreds, tens and units" check relay, (HTUK). If a circuit fault should result in the operation of more than one of the (PN), (TN) or (PTN) relays, the interconnection of the contacts of these relays is such as to prevent the operation of the (HTUK) relay. Any fault which prevents the operation of the (HTUK) relay within a prescribed time interval results in a trouble indication on equipment associated with the marker.

In addition to the checking function described, the (PN), (TN) and (PTN) relays also identify the number called as to its physical or theoretical classification. In some offices the directory numbers are divided into groups so that service to these numbers may be restricted in accordance with the origin of the call. These groups are of one hundred lines each and are divided between three classes of lines representing physical, theoretical and nondiscriminating numbers. In some offices one unit is split into two office codes for zoning or other reasons. In these cases one office code covers the physical numbers and the other the theoretical numbers. Offices having both physical and theoretical numbers may have some numbers which can reach lines in either office. These are called nondiscriminating numbers. As previously indicated, each block of one hundred numbers as represented by one of the PT– punchings is connected to one of the three punchings PN, TN or PTN representing a physical number, a theoretical number or a non-discriminating number, respectively. By this means the group designation of the called line is given to the marker in the form of an energized (PN), (TN) or (PTN) relay. This information is utilized by the marker through the medium of contacts, not shown.

Figs. 4 and 5 show the translating and cross-connecting grid employing one miniature gas diode per item of translator output information for each directory number. The horizontal bus-bar to which one terminal of each diode is connected is supplied through a resistor with a voltage of approximately −90 volts which, together with the −50 volts normally appearing on the vertical bus-bar, results in a voltage across each diode of about 40 volts, a value below the breakdown limit of the diodes. Positive 50 volts on one of the units bus-bars, however, fires all the gas diodes on this particular bar installed as cross-connectors in the translator grid. The firing of each diode will cause the potential on the corresponding horizontal bus-bar to change from −90 volts to approximately −30 volts on the basis of a diode drop of 80 volts. Each horizontal bus-bar is capacitively coupled to a gas triode which acts as a work tube. These tubes are designated FT0–3, FU0–9, etc. The rise of 60 volts on a horizontal bus-bar triggers the corresponding gas triode which in turn causes operation of the corresponding receiving relay in the marker circuit. With −30 volts on a horizontal bus-bar, back-ups into other diodes on the same bus-bar will not occur since such diodes will have approximately −50 volts on their other electrodes with a resulting non-operate voltage of about 20 volts as compared to a non-operate capability of 60 to 65 volts minimum.

There are six groups of output information from the translator grid. The first and second groups together tell the line link frame location of the called number. In one office there may be as many as forty line link frames. The first translator group has four horizontal bars which tell the tens digit of the number corresponding to the location of the line link frame. These bars are designated FT0–FT3. The second group tells the units digit of the number corresponding to the line link frame. This group has ten bars designated FU0–FU9. Each line link frame may have as many as fourteen vertical groups of lines of five lines each. The third translator group has fourteen horizontal bars designated VG0–VG13 and they tell the vertical group location of the line. Each line link frame also has ten horizontal groups and the fourth translator group has ten horizontal bars designated HG0–HG9 to determine the horizontal group location of the line. The fifth translator group has five horizontal bars designated VF0–VF4 and denotes the vertical file number or the location of the individual called line within the five line vertical subgroup. The last translator group determines the ringing combination required to signal the particular called line and station. This group has fifteen horizontal bars designated RC0–RC14 to determine the side of the line to which ringing voltage should be applied, the polarity of the voltage, and whether or not ringing signals should be applied in code combinations. One of these fifteen horizontal bars, the RC10, is used for the special purpose of signifying that the called number is the first number of a P. B. X group of lines over which hunting is required. When one diode in each of these six translator groups has been fired, the physical location and required ringing signal of the called line are made known to the marker.

When one of the four translator output work tubes FT0–3 fires, the associated (FTN0–3) relay operates. The (FTN–) relay in turn operates the corresponding (FTT–) relay known as a test relay which extends its operating ground to the (FTL) relay which also operates and locks. The locking of the (FTL) also locks operated the (FTT–) relay and holds the latter beyond the point at which the number group circuit is released and at which the (FTN–) relay is also released. The (FTL) is common to the frame tens group and serves to hold any one of the previously operated (FTT–) relays. Through the medium of contacts not shown the (FTT) relay provides the registration of the information item it represents and which is used later by the marker in obtaining access to the called line. One relay out of each set corresponding to the (FTT–) is operated in each of the other five sets for recording identification information as to frame units number, vertical group number, horizontal group number, vertical file number and ringing combination number. Also, the "lock" relays in each of the other five sets is operated and locked. These are designated (FUL), (VGL), (HGL), (VFL) and (RCL). The locking circuit for all six lock relays is under control of the previously operated LL1. On calls other than those requiring a line hunting operation, such as the case of a P. B. X trunk group, the point at which all six lock relays operate marks the end of the number group decoding and translating operation and the point at which this circuit may be released and made free to serve other calls. The release of the number group circuit is initiated by the completion of a chain circuit (not shown) through the six operated lock relays which cause the operation of the "release number group" relay (RNG) (not shown). The operation of (RNG) releases (SNG2) and the off-normal ground supply relay (NGC). The release of (SNG2) releases the marker preference relay (MP) and all of the number group connector relays. With these relays released the number group tubes are extinguished and the circuit restored to normal. The release of the (MP) relay recloses the marker preference chain circuit which makes it possible for another marker to seize the number group by operating its associated (MP) relay.

In the event the called number corresponds to a P. B. X (private branch exchange) group of lines, it is necessary for the marker to know which lines of the group are idle, to select one of the group, and to learn from the number group circuit the equipment location of the particular line selected. P. B. X line groups ordinarily contain ten or fewer lines and the group can be identified by the thousands, hundreds and tens digit of the directory number. When such groups are present an (SC–) relay is cross-connected to the appropriate punching in the series designated TB00 to TB99. When one of the tens tubes (00 to 99) in Fig. 3 is fired, the resulting rise in cathode potential from −50 to about +50 volt serves to operate the cross-connected (SC) relay in addition to energizing the vertical tens bus bar and operating one of the (PN), (TN) or (PTN) relays. The operation of the (SC) relay completes the paths of ten or fewer line sleeves which, under the assumed conditions, have been cross-connected to the series of NS0–9 punchings, to leads "S0" to "S9" leading to the marker. These paths provide a means for testing the busy or idle condition of the line sleeves by means of the (SL0) to (SL9) relays in the marker.

When the directory number received signifies that a P. B. X is being called, in addition to providing for the operation of the appropriate (SC–) relay as described, it is also necessary to advise the marker that the latter should take steps to test the P. B. X group of lines. The marker is given a signal to this effect by the placement of the ringing combination diode in the translator grid at the intersection of the units bus-bar corresponding to the directory number and the ringing combination number 10 horizontal bus-bar. This diode cross-connection results in the firing of the RC10 tube, the operation of the (RCN10) receiving relay and the (RCT10) test relay. This particular test relay, however, is unable to operate and lock the (RCL) at this time because the path to the latter is open at the contacts of the unoperated (CKR) relay. Instead, the (RC10) operates (PBX1) and (PBX2) relays which set up circuit conditions that will result in canceling the units digit initially given to the decoder, the cancellation of the received information from the translator, the testing and selection of an idle line within the P. B. X group, the transmission to the decoder of a new units digit (in accordance with the above selection), a second decoding and translating operation and the registration of a new set of signals on the information receiving relays identifying the equipment location of the particular P. B. X line selected.

With the (PBX1) and (PBX2) relays operated, the (SLCK) relay operates over the "SCK" lead from battery on the contact of the (SC–) relay in the number group. (SLCK) in turn operates relay (CKO) through a previously closed chain circuit through all lock relays excepting the (RCL). (CKO) locks to (NGC) ground and releases (SNG2), (UC) and (LL1) relays. (SNG2) releases connector relays (MCA—T) and (MCB). Connector relays (MCA—B) and (MCC) are held operated by virtue of contacts on (PBX1) maintaining −50 volts on leads "ST" and BS4." The release of relay (UC) together with the prior operation of (PBX1) operates relay (SLC) which finally closes the connections between sleeve test relays SL0 to SL9 and the ten or fewer line sleeves via (SC–) relay operated and punchings NS0–9. (LL1) relay in releasing releases all lock relays and associated information relays, thus canceling the previously received information. The release of relay (UC) withdraws +130 volts from the anodes of the units tube thus restoring the latter. The release of connector relays (MCA—T) and (MCB) releases the information number relays and restores to normal the tubes in the translator circuit.

Those sleeve test relays in the (SL0–9) group whose windings find −50 volts (idle condition) on corresponding line sleeves, rather than ground (busy condition), will operate and in turn operate and lock auxiliary relays (SA0–9). A chain circuit through contacts of the latter relays causes the +130 volt potential supplied through the units digit register (previously set in accordance with the units digit of the P. B. X directory number) to be applied to the "U–" lead corresponding to the first line sleeve, in ascending numerical order, found idle as indicated by the lowest numbered (SA–) relay operate. Following the operation of one or more (SA–) relays the (SAE) operates and this in turn releases (SLC). The (RCT10) relay having been previously released following release of (MCB) and (RCN10), and the lock relays having been released, a chain circuit is closed for operating (CKR). (CKR) causes the reoperation of (SNG2) and (LL1). The reoperation of SNG2 causes the reoperation of connector relays (MCA—T) and (MCB) which complete the reestablisments of all connections between the marker and the number group.

A new units lead now being energized by the application of +130 volts, a new units tube will fire and energize a new vertical bus-bar in the translator grid. The particular pattern of diodes installed will fire and cause the transmission to the marker information relays a new set of information defining the location of the P. B. X line finally selected and also identifying the type of ringing signal required. Since on this final phase of the call some (RCT–) relay other than (RCT10) will operate, the (RCL) will operate with the result that a chain circuit (not shown) through all lock relays will be completed and will operate the (RNG) relay (not shown) for releasing the number group circuit as previously mentioned in describing a call not requiring P. B. X hunting.

In case the switching system under consideration is used as a tandem switching point, tandem trunks appear on the line link frames and incoming calls destined for these trunks require the use of the number group circuit just as if these calls were destined for subscribers' lines. In such a case the number of the tandem trunk is furnished to the number group circuit in the usual way but because of its special meaning a (TN–) relay shown in the upper part of Fig. 3 is cross-connected to one of the TB00 to TB99 punchings. The operation of this relay furnishes a special ground signal over the (TNK) lead to the marker with the result that the marker is advised that the number in question pertains to a tandem trunk so that it can take appropriate action in completing the connection.

In Fig. 6 part of a model translator cross-connecting grid is shown. Mounted above an insulating panel 69 are a series of vertical bars 60, 61, 62, 63, 64, etc., each bar being punched with as many holes as required for all possible items of translator output information. As indicated in previous paragraphs the total would be fifty-eight for the No. 5 cross-bar office number group. These holes are suitable for receiving the miniature bayonet base type tube such as 50. Underneath the bank of vertical bars and at right angles to them are a series of multiple contact strips 70, 71, 72, 73, etc., mounted on insulating panel 79, and arranged so that an individual spring contact finger is under each hole of the vertical bars. The tube is fully inserted and then given a turn so that its two radial pins will find corresponding depressions in the under side of the vertical bar and thus lock. This multiple socket mounting of the basic cross-connecting elements facilitates quick changes in translator output information when line changes are required due to traffic and administration conditions.

A variation to the above-described system of decoding a three-digit number may be provided by the use of one thousand four-element gas tubes instead of the eleven hundred three-element tubes. The tube required is one in which the control gap is separate from the main gap. In order to bring about ionization within the tube and have the discharge transfer to the main gap, it is necessary to have a particular pattern of three potentials present in addition to —50 volts on the cathode. The control anode, control cathode and main anode potentials are applied on a decimal system basis similar to that previously described. Only one tube will fire because only one will have all three potentials present.

In addition to the above, minor changes in potential conditions will permit the use of dry rectifiers or other unilateral or non-linear cells as cross-connecting elements instead of gas diodes, since these elements meet the basic requirements of the translator grid, namely, to extend a voltage of a given polarity signal from a given vertical bus-bar to its cross-connected horizontal bus-bars but not to allow the reverse order of transmission.

What is claimed is:

1. In a translating device, a plurality of code points, a plurality of output circuits, means for interconnecting any of a plurality of said code points to any of a plurality of said output circuits without interference one with another which comprises a code point conductor interconnected with each of said code points and arranged in accordance with one coordinate, an output conductor insulated from said code point conductors interconnected with each of said output circuits and arranged in accordance with another coordinate, a non-linear circuit element, means for detachably supporting said non-linear circuit element in contact with one of said code point conductors and one of said output conductors adjacent the interconnection of said conductors, and means interconnected with each of said output circuits responsive to an application of a predetermined potential condition to any one of said code points interconnected therewith through one of said non-linear circuit elements.

2. In a telephone switching system of a common control type, translating apparatus for translating dialed signals representing a directory number comprising a plurality of code points, a plurality of gaseous conduction tubes, means operative under control of dial signals representing two digits of a directory number for selectively initiating a discharge through one of of said tubes, a second plurality of gaseous conduction tubes, means operative under control of other dial signals representing another digit of a directory number and said discharge through said selected tube of said first plurality of tubes for selectively initiating a discharge through a tube of said second plurality of tubes, apparatus responsive to said discharge through said second selected tube for applying a predetermined electrical condition to one of said code points.

3. In a telephone switching system of a common control type, a plurality of lines, a plurality of code points, translating apparatus for translating a plurality of series of dial signals comprising a plurality of gaseous conduction tubes, means interconnected with said tubes responsive to two series of said dial signals for selectively initiating a current discharge through one of said tubes, a second plurality of gaseous conduction tubes, means interconnected with both of said pluralities of tubes responsive to another series of dial signals and said discharge through said selected tube of said first plurality of tubes for selectively initiating a discharge through a selected tube of said second plurality of tubes, apparatus connected to said tubes and to said code points responsive to said discharge through said second selected tube for applying a predetermined electrical condition to one of said code points, a plurality of output circuits designating the location of said lines and detachably supported gaseous conduction tubes for interconnecting said code points and selected ones of said output circuits, and apparatus interconnected with said output circuits responsive to the application of said predetermined electrical condition to said code points through said gaseous conduction tubes.

4. In a telephone switching system of the common control type, a switching center, an incoming line connected to said switching center, a plurality of output circuits to which a call may be directed interconnected with said switching center, a translating device comprising in combination a plurality of gaseous conduction tubes, apparatus interconnected with said tubes and controlled by signals representing two digits of a directory number for selectively initiating a discharge through one of said tubes of said plurality of tubes, apparatus interconnected with said tubes and controlled jointly by signals representing another digit of said directory number and the initiation of said discharge through said selected one of said tubes for initiating a search for an idle one of a group of said output circuits, and apparatus interconnected with said tubes for translating said signals representing said directory number into designations of the location of an idle output circuit in said switching office.

5. An interconnecting arrangement comprising in combination a first group of conductors arranged in accordance with one coordinate of an array, a second group of conductors arranged in accordance with another coordinate of said array, a plurality of two-element gas discharge tubes, means for detachably supporting one of said tubes at each of the interconnections of said coordinates with one of said elements electrically connected to one of said conductors and the other of said elements electrically connected to the other of said conductors at said intersections, means for applying a predetermined electrical condition to a conductor of said first group of conductors, and apparatus interconnected with each of said conductors of said second group responsive to the potential condition applied to said first conductor when said conductors are interconnected through said gaseous conduction tubes.

6. In combination in a telephone switching system, a central switching station, a plurality of telephone lines extending to said switching station, a plurality of code points, translating apparatus for translating signals representing numbers dialed over said lines, a plurality of conductors connected to said code points and arranged in accordance with one coordinate of an array, a second plurality of conductors arranged in accordance with another coordinate of said array and insulated from said first plurality of conductors, a plurality of non-linear circuit elements, means for detachably supporting each of said non-linear circuit elements at intersections of said conductors and in electrical contact with the conductors which intersect at the respective intersections, a first plurality of gaseous conduction tubes, means interconnected with said tubes and said switching center responsive to signals representing two dialed digits for selectively initiating a discharge through one of said plurality of tubes, a second plurality of gaseous conduction tubes, means interconnected with said switching center and said second plurality of tubes and responsive to signals representing an additional dialed digit and to said discharge through said selected tube of said first plurality of tubes for selectively initiating a discharge through a tube of said second plurality of tubes, apparatus interconnected between said code points and said second plurality of tubes for applying a predetermined voltage condition to one of said code points in response to a discharge through one of said tubes of said second plurality of tubes, apparatus connected to each of said conductors of said second plurality of conductors responsive to said predetermined voltage condition applied to said code point and transmitted through said non-linear circuit elements.

FRANK K. LOW.

REFERENCES CITED

The following references are of record in the file of this patent:

UNITED STATES PATENTS

| Number | Name | Date |
|---|---|---|
| 2,023,589 | Hersey | Dec. 10, 1935 |
| 2,291,752 | Parker | Aug. 4, 1942 |